March 3, 1931. J. McC. EDWARDS 1,794,452
SUPPLY DEVICE FOR CENTRIFUGAL LIQUID SEPARATORS
Filed Aug. 8, 1929

INVENTOR
J. M. Edwards,
BY
ATTORNEY

Patented Mar. 3, 1931

1,794,452

UNITED STATES PATENT OFFICE

JAMES McCOSH EDWARDS, OF CEDAR HEIGHTS, IOWA, ASSIGNOR TO ASSOCIATED MANUFACTURERS CORPORATION OF AMERICA, OF WATERLOO, IOWA, A CORPORATION OF DELAWARE

SUPPLY DEVICE FOR CENTRIFUGAL LIQUID SEPARATORS

Application filed August 8, 1929. Serial No. 384,437.

My invention relates to improvements in supply devices for centrifugal liquid separators, and the objects of my improvements are, first, to shape the cup which receives and delivers the liquid to be separated in a manner to prevent splashing of its contents incident to the downward rush of the milk from the supply tank; second, to so shape the cup that it will direct and guide an included float, that the float, when by itself or with projections thereof is moving up or down in the cup upon the liquid contents, the float or its projections closely abut upon the inner wall of the cup nontiltingly and centrally to equalize distribution of the entering liquid between the float and the cup therearound; and third, to provide means within the cup to prevent formation of gyrations of the liquid therein, so that the liquid may be poured through a central delivery aperture or nipple of the cup in an even, steady and constant stream to and into the receiving member of a centrifugal separator below, and thus control the amount of milk which runs through the separator by controlling the head of the milk in the supply cup.

Figure 1:
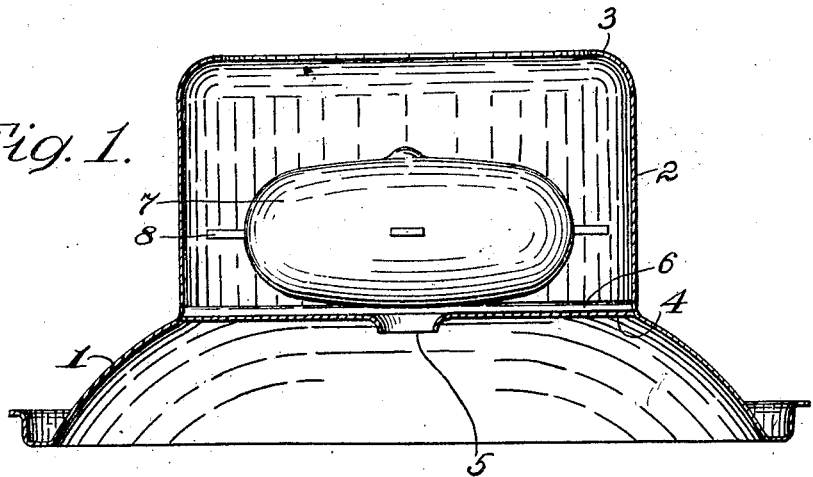
Figure 2:
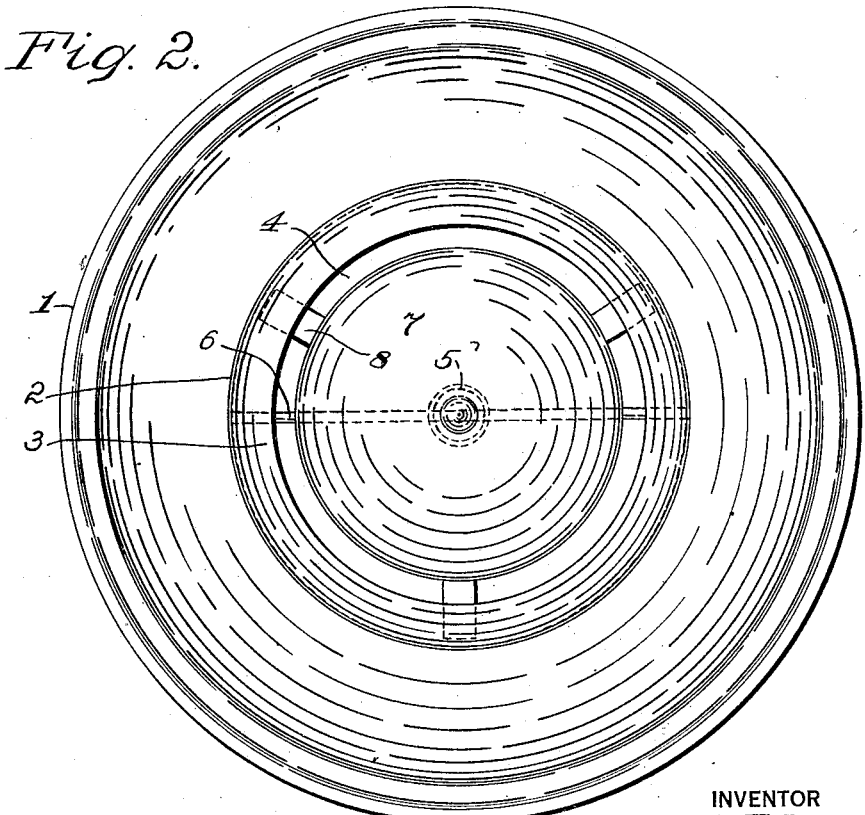

I have, after successful trials, accomplished the above objects by the means which are hereinafter described and claimed, and which are illustrated in the accompanying drawings, in which Fig. 1 is a vertical central cross section of a combined pan cover and a receiving cup, showing in the cup a float, all constructed and associated under the principles of my invention, and Fig. 2 is a top plan thereof.

It is well known to those skilled in this art, that early centrifugal liquid separators were comparatively small, hence there was but little difficulty in the regulation of the feeding of liquid to be separated, such as whole milk, to the separator, but in the larger machines now usually manufactured and used, the governing of the liquid supply is subject to different difficulties which it is my purpose herein to completely obviate.

The improved supply means of my invention permit the maintenance of a necessary head of the milk in the receiving and delivering cup of the cover of the milk-pan and without splashing due to rush of the milk, so that the milk is delivered to the separator in a constant regulated flow.

The numeral 1 denotes a convex milk-pan cover whose fixed horizontal and central covering plate 4 constitutes the bottom of a superposed central upwardly directed supply receiving and delivering cup 2, with open top whose rim 3 is curved inwardly annularly for a purpose to be disclosed. The side wall of the cup 2 is cylindrical and concentric with said cover 1, and therefore its inner face is vertically straight in line as far as to the incurved rim 3. The fixed septum or bottom part 4 has a central aperture rimmed downwardly into a short depending nipple 5.

To govern the milk content of the cup 2, a float 7 is buoyantly supported within the cup below the rim 3 and upon the milk delivered into the cup, where it regulates the amount received in a well known way to keep the milk at a desired height in the cup to produce a desired head therein. The float shown is oblate and may itself extend almost to the inner wall of the cup 2, or may have evenly spaced therearound a number of outwardly directed projections 8, which themselves closely approach the cup to maintain the float centrally therein while moving up or down in it, and as these projections 8 are preferably radially extended from the equatorial line of the float, the straight wall of the cup causes the float to move without tilting or from eccentric displacements, which in itself tends to prevent uneven delivery past the float with the formation of eddies in the milk below. In cases where the cup has outwardly bulged walls this guiding of the float is absent, so that the float may tilt under impact of entering milk, or become centrally displaced, all of which creates irregular delivery of the milk into the separator. The milk should be delivered evenly and constantly, under the desired head into the separator in order to obtain a uniform cream.

In order to further control the passage of milk through the cup and its delivery nipple to accomplish the above purpose, I have fixed diametrically across the bottom of the cup and the aperture of said nipple 5 a wire 6.

This wire 6 has a baffling action upon the milk in the cup which is thus prevented from gyration before it is discharged downwardly through the nipple to the separator below.

This combination of a cup properly curved inwardly at the top, with a float and a cross wire, permits the maintenance of a higher head in the milk in the cup. This cup with a float as above described, together with regulating means for stopping gyration or agitating of the milk as it goes into the feed-cup, permits us to not only maintain a higher head of milk, but also to use a lower cup, which is very advantageous.

Having described my invention, what I claim as new, and desire to secure by Letters Patent, is:

1. An open cylindrical cup having an inturned rim part and also a downwardly rimmed centrally located nipple, and a diametrical bottom cross member within the cup for baffling gyratory movements of the liquid contents of the cup before delivery through said nipple.

2. An open cylindrical cup mounted on a pan-cover and having a central bottom delivery aperture thereinto, also having a cylindrical wall terminating upwardly in an incurved annular rim, a float in said cup movable vertically non-tiltingly close to the wall thereof, and a baffling rod fixed across the bottom of the cup and said aperture diametrically to stabilize the action of the float and prevent gyration of liquid.

In testimony whereof I affix my signature.

JAMES McCOSH EDWARDS.